April 29, 1947.                    E. LABIN                    2,419,566
                              PULSED OSCILLATOR
                                                           2 Sheets-Sheet 2
                              Filed March 7, 1942
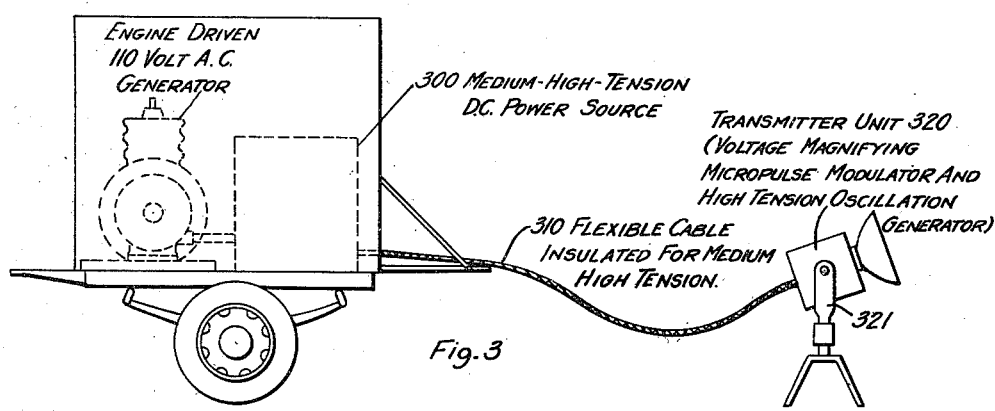
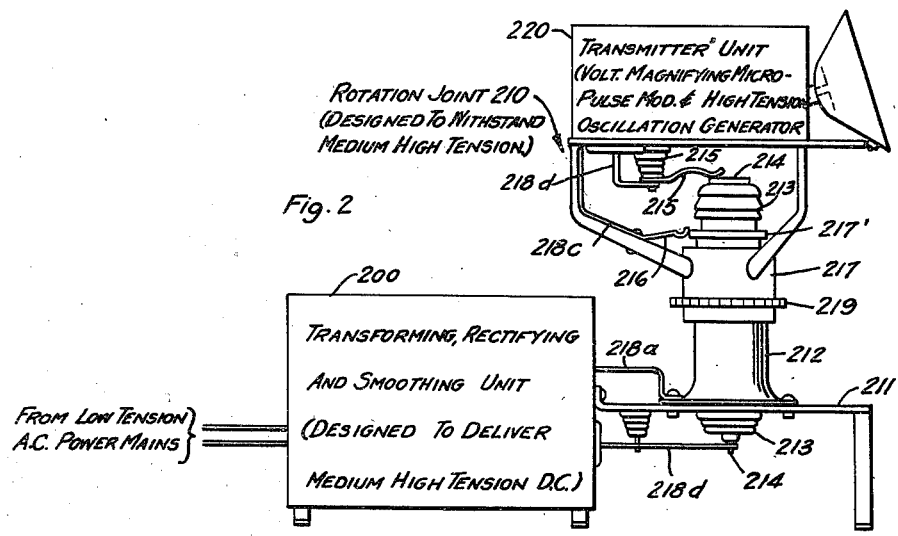
INVENTOR.
EMILE LABIN
BY
Paul R Adams
ATTORNEY Patented Apr. 29, 1947

2,419,566

UNITED STATES PATENT OFFICE 2,419,566

PULSED OSCILLATOR

Emile Labin, New York, N. Y., assignor to Federal Telephone & Radio Corporation, a corporation of Delaware Application March 7, 1942, Serial No. 433,762

9 Claims. (Cl. 250—36)

The present invention relates generally to systems for radiating brief trains of high frequency waves with very high power. The present application is a continuation-in-part of my copending application Serial No. 406,499, filed August 12, 1941, for "Pulse transmitters."

It is an object of my invention to provide a system for generating very brief trains of short waves, hereinafter referred to as "wave pulses," with sufficient power so that these can be further radiated to long distances without additional amplification. It is also an object to provide such a system which shall be readily portable and especially adapted for use on ships or in the field especially in gunfire control systems and other radio location systems and/or in direction finding systems.

More particularly, it is an object of my invention to provide a system for radiating wave pulses of high power in a direction which can be tilted or otherwise rotated.

It is known that in connection with direction finding and radio location it is advantageous to radiate wave pulses from an antenna system rotatably mounted so as to be capable of rotation about a vertical or horizontal axis, or both. It has been proposed to effect this by providing a flexible or hinged connection between the wave pulse transmitter and the radiating antenna, but such flexible or hinged connection has been found to be a source of weakness and trouble, especially when wave pulses having a carrier frequency of several hundred megacycles and a peak power of several hundred kilowatts are to be radiated.

To avoid these difficulties it would be possible to arrange the complete transmitter, including the oscillation generator, modulator and the high tension power supply equipment therefor as one integral unit rigidly connected to the antenna and then to mount such unit in rotary fashion so that the unit could be rotated vertically or horizontally as desired. Such an arrangement, however, necessitates very heavy mounting means and considerable power for effecting the rotation since the complete transmitter equipment for an installation of several hundred kilowatts peak power would ordinarily weigh hundreds, or even thousands, of pounds.

In order to avoid these disadvantages it has also been proposed to arrange only the actual oscillation generating stage of the transmitter equipment as an integral unit rigidly connected to the antenna structure and then to mount this unit rotatably, while arranging the heavy power transformers and rectifier equipment in a separate unit which is mounted in stationary fashion. Such a system has the grave disadvantage that the high tension D. C. power for the oscillation generator equipment must be transmitted from the stationary power supply unit to the movable oscillation generator unit and thus must necessarily pass through a flexible cable, a hinged conductor, or some equivalent arrangement, any one of which is likely to cause trouble when subjected to unduly high voltages. It has therefore, in the past, been necessary to limit the anode supply voltage of the oscillation generator to a moderate value which could safely be carried through the flexible, hinged, or otherwise jointed conductor arrangement which extends between the fixed and the movable units. This limitation on the anode supply voltage makes it more difficult to attain high efficiency and high output.

It is accordingly an object of my invention to overcome the above disadvantages.

More particularly it is an object of my invention to provide a wave pulse radiating system wherein high power wave pulses are radiated from a comparatively light, readily movable unit, and wherein the high frequency oscillation generator is supplied with very high-tension D. C. plate supply power and wherein, also, all high-tension D. C. power transmission and all short-wave power transmission is effected over short rigid unjointed conductor arrangements.

In accordance with my invention the movable unit of a wave pulse generating system comprises, in addition to the antenna and actual oscillation generating circuit, a modulator of a type wherein a current is passed through a high power inductance to charge the latter and then is suddenly interrupted to produce a brief surge of substantially higher voltage than the voltage originally used to charge the inductance. A direct current power supply unit of substantially lower voltage than the voltage required for efficient operation of the oscillation generating circuit is then provided in the stationary unit and is connected through a flexible cable or jointed conductor arrangement to the movable unit with its inductive modulator, oscillation generator, and antenna.

By virtue of the voltage magnifying action of such inductive modulator the medium high voltage supply from the D. C. power supply unit is raised to a much higher voltage before application to the oscillation generating circuit, thus enabling the latter circuit to operate with higher efficiency and with high peak power. At the same time, by virtue of the moderate voltage of the D. C. power supply unit, the difficulties encountered when transmitting high tensions between the two relatively movable units are overcome. Thus ordinary flexible cables or conventional types of hinged joints, such as slip-ring joints, can be used to carry the medium-high-tension power from the fixed power supply unit to the movable unit containing the modulator, oscillation generator, and antenna.

It is a further object of my invention to provide an especially efficient and compact modulator of the inductive type which shall be particularly suitable for use in the combination above mentioned but which shall also be advantageous for other uses.

The exact nature of my invention may best be understood from the following detailed description taken from the attached drawings in which:

Figs. 2 and 3 are elevations showing specific embodiments of the type of system schematically represented in Fig. 1.

Figure 1:
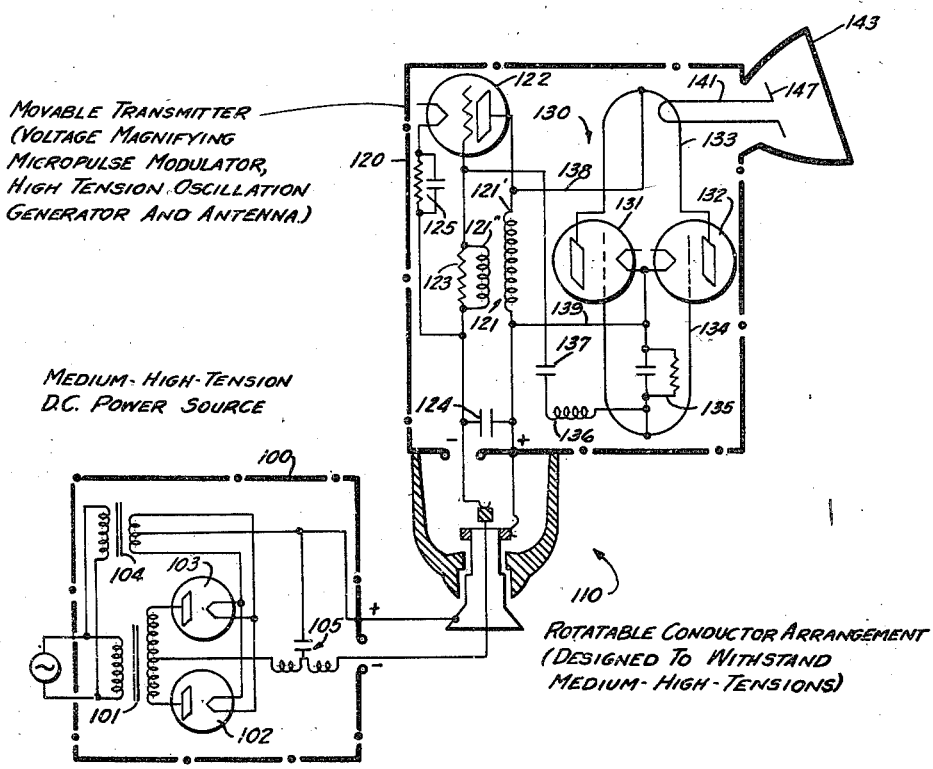
Fig. 1 is a schematic circuit diagram of a system embodying my invention.

Referring to all three Figs. 1–3, it will be seen that a system embodying my invention may consist principally of a medium high tension D. C. power supply source 100, 200, or 300 connected through some sort of rotatable conductor arrangement 110, 210, or 310 to a movable transmitter unit 120, 220, or 320.

Referring more particularly to Fig. 1, it will appear that the medium-high-tension D. C. power supply source 100 is of conventional construction comprising a step-up transformer 101, a pair of rectifier tubes 102, 103, a filament transformer 104, and a suitable high tension smoothing filter 105. It will be understood, however, that this power source may be of 3-phase or 6-phase type in order to minimize the amount of ripple to be smoothed and thus reduce the size and weight of filter 105. It will also be understood that in many cases this filter 105 may be wholly or partially dispensed with. The output from the power source 100 is preferably between 3,000 and 14,000 volts. In fact I prefer to keep this voltage below 11,000 volts for most portable systems to be employed in the open.

The medium-high-voltage output from the unit 100 is then passed through some sort of rotatable conductor arrangement 110. In Fig. 1 this arrangement is represented as consisting of two rigid double-conductor lines joined by a rotatable joint of the slip ring type, but it will be understood that some other type of rotatable joint or hinge may be used, or that the rigid conductors may instead be replaced by conductors which are inherently sufficiently flexible to allow relative movement of the units 100 and 120 thus avoiding the need for any special joint. In any case, however, the conductor arrangement which interconnects the units 100 and 120 must be capable of bending, twisting or tilting, and all such conductor arrangements may be generically referred to as rotatable conductor arrangements.

The medium-high-tension power which is supplied through rotatable conductor arrangement 110 to the unit 120 is applied, in accordance with my invention, to an inductive modulator which effectively magnifies this voltage to a substantially higher value before applying it in the form of brief pulses to the actual oscillation generating circuit 130. The inductive modulator which effects this voltage magnification essentially comprises a high power inductive device 121 connected in series with the space path of a vacuum tube 122.

The preferred embodiment of device 121 is a transformer having a primary winding 121' and a secondary winding 121'', the primary winding 121' being connected in series with the space path of tube 122 and the medium-high-tension voltage from power source 100. The secondary winding 121'' is connected to the input of this tube 122, i. e. between the grid and cathode, in series with a low impedance R.-C. circuit 125. This R.-C. circuit may be placed in the grid leg, but is preferably in the cathode leg as shown, so as to be traversed not only by the grid current but also by the plate current. A resistance 123 is shunted around secondary 121'' to minimize the extent of impedance variation of the load on this secondary. An ultra short wave oscillator 130, which may for the present be regarded merely as a load having effective resistance and capacity, is connected across primary 121'. A by-pass condenser 124 is connected across the medium-high-tension supply from conductor arrangement 110.

The manner of operation of the inductive modulator is as follows:

(0a) The condenser of circuit 125 is normally charged so as to maintain the cathode substantially more positive than the grid of tube 122 so that this tube is normally non-conductive. Gradually the charge of this condenser leaks off through the associated resistor of circuit 125 until finally after a suitable interval (e. g. 30–30,000 microseconds) the negative grid bias becomes just equal to the bias required for cutoff.

(1a) Now the space path of tube 122 commences to pass current. This current flows from the positive side of power source 100 through rotatable conductor arrangement 110, winding 121', space path of tube 122, resistance-condenser circuit 125, thence back over conductor arrangement 110 to the negative side of the power source 100. As this current builds up, the increase thereof induces in secondary 121'' a voltage tending to make the grid of 122 strongly positive. Thus, the space path becomes still more conductive which in turn permits the current to rise still faster thereby inducing a still greater positive voltage on the grid. By virtue of such cumulative action the grid very rapidly becomes so intensely positive that the space path of tube 122 has a negligible impedance compared to the impedance of winding 121'. All this occurs in a very short time, e. g. 1 microsecond or less.

(1b) The current now continues to rise, being limited almost wholly by the inductance 121' which is now the predominant impedance of the circuit. During the passage of this current the condenser of circuit 125 becomes gradually charged so as to make the cathode more and more positive, but by reason of the very high potential of the grid at this time the space path of the tube still continues to be highly conductive.

(2a) After a suitable charging interval (say 15 to 150 microseconds) the rate of building up of the current will become comparatively small. This reduction in the rate of increase of the current may be initiated either by approaching the saturation current capable of being carried by the space path of tube 122 or by approaching the equilibrium current determined by the resistance of the space path of tube 122 and the voltage of the power supply; alternatively, the decrease in the rate of growth of the current may be initiated by actually building up such a high charge in the condenser of circuit 125 as to bring the cathode to a potential somewhere near that of the grid. Whatever its cause, the reduction in current acceleration produces a reduction in the E. M. F. induced in secondary 121'', thus diminishing the positive potential on the grid of tube 122 to a point where the impedance of the space path is no longer negligible. The impedance of this space path then causes the current to decrease; and this decrease in turn makes the grid negative. This mutual action results in very rapidly bringing the grid to a high enough negative potential to wholly cut off all current through tube 122. This action may take place within a fraction of a microsecond.

(2b) The above described abrupt termination of the current through tube 122 causes a voltage surge by reason of the self-inductance of transformer 121 and especially that of primary winding 121'. The peak voltage value of this surge and the duration thereof depend principally upon, first, the inductance of winding 121', second, the natural oscillation frequency of this winding (taking into account its own distributed capacities as well as the capacities of tube 122, oscillator 130 and the associated wiring), third, the resistance of the load which is effectively connected across winding 121' (taking into account not only the apparent resistance of oscillator 130 but also the value of resistance 123 as viewed through the transformer 121), and fourth, the peak value of the current which was flowing through winding 121' at the instance of cut-off. These parameters may be designated respectively $L$, $F_0$, $R$ and $I_m$.

In terms of $L$ and $I_m$ one can readily compute $E_s$, the amount of energy stored in the inductive device, by the formula $E_s = 5LI_m^2 \times 10^6$ ergs.

In order to obtain the maximum peak power delivered to load $R$ from an inductive device of given inductance $L$ and a given natural frequency $F_0$, the resistance of the load should be equal to the critical damping resistance $R_c$ as given by the following formula: $R_c = \pi L F_0$.

If the actual load resistance $R$ equals $R_c$ as above explained, then the following formulae are applicable for computing $V_m$, the peak voltage, and $W_m$, the peak power of the pulse as well as $T_d$, the effective duration of such pulse (the "effective duration" being defined as the time during which the pulse has more than half its peak amplitude):

$V = 2.3\ I_m L F_0$ volts; $W_m = 1.68\ I_m^2 L F_0$ watts; $T_d = .45/F_0$

The above formulae may be applied to certain typical circuits as follows:

Low voltage circuit $L = 70 \times 10^{-3}$ hys.; $F_0 = 36$ kc./sec.; $I_m = 1$ amp.
$E_s = 350{,}000$ ergs.
$R_c = 7900$ ohms
$V_m = 5800$ volts (assuming $R = R_c$)
$W_m = 4200$ watts (assuming $R = R_c$)
$T_d = 13$ microseconds (assuming $R = R_c$)

Medium voltage circuit $L = 15 \times 10^{-3}$ hys.; $F_0 = 170$ kc./sec.; $I_m = 2.5$ amps.
$E_s = 470{,}000$ ergs.
$R_c = 8000$ ohms
$V_m = 14{,}500$ volts (assuming $R = R_c$)
$W_m = 27$ kilowatts (assuming $R = R_c$)
$T_d = 2.6$ microseconds (assuming $R = R_c$)

High voltage circuit $L = 3.5 \times 10^{-3}$ hys.; $F_0 = 320$ kc./sec.; $I_m = 11.5$ amps.
$E_s = 2{,}300{,}000$ ergs
$R_c = 3500$ ohms
$V_m = 30{,}000$ volts (assuming $R = R_c$)
$W_m = 250$ kilowatts (assuming $R = R_c$)
$T_d = 1.4$ microseconds (assuming $R = R_c$)

It will be noted that the three circuits above computed have energy storage capacities of the same general order of magnitude (i. e. of the order of $10^6 \pm \frac{1}{2}$ ergs) but yield very different powers because of the different durations of the surges.

In accordance with my invention it is preferred in most cases to design the inductance for storing at least 300,000 ergs of energy, and to make the duration of the surge so short as to obtain a power of the order of several kilowatts or more. I deem it generally desirable to design the inductive device to have a natural frequency above 30 kilocycles (taking into account the associated wiring and tube capacities as well as its own capacity). Such design will give an effective duration $T_d$ of about 15 microseconds if the effective load resistance is $R_c$, and will in any case give a duration of less than 20 microseconds if the load is of the same general order of magnitude as $R_c$. Preferably the effective duration of the surge should be less than 6 microseconds.

The same voltage surge which delivers to the oscillator 130 the high voltages and high peak powers above discussed also induces in secondary 121" a high negative voltage. It should be noted that a very considerable negative voltage is required on the grid at this instant in order to maintain the tube blocked in spite of the very high positive surge on the plate. But this required voltage, though high, is still much lower than the plate voltage. If the amplification factor of the tube is 20 for example, there need only be a little more than $\frac{1}{20}$ as much negative voltage on the grid as positive voltage on the plate at this instant. In the case of the high voltage circuit above computed this would require only a little more than 1300 volts negative potential on the grid.

Preferably, however, the transformation ratio of the device 121 is much greater than that which would suffice to give the required negative bias on the grid at this instant, this transformation ratio being chosen fairly high in order to give optimum conditions during the charging period when current is being built up in the inductive device and being preferably between 0.5 and 0.8.

In order therefore to avoid the generation of unnecessarily large negative potential on the grid at the instant of cut-off, a resistor 123 is shunted around the secondary winding 121". The effect of the resistance 123 is to substantially reduce the negative surge applied to the grid during the discharge portion of the cycle, thus minimizing the danger of a breakdown from grid to cathode. At the same time the resistor 123 makes no appreciable difference in the amplitude of the positive potential applied to the grid during the charging portion of the cycle, since the impedance of the grid at this time is so low that the loss to the resistor 123 may be neglected. The value of resistor 123 is not critical. It is merely necessary that this resistor be large compared with the grid resistance during the charging portion of the cycle while at the same time the resistor must be low enough to limit the negative surge on the grid to a safe value during the discharge portion of the cycle. To prevent this shunt resistance from draining too much power from the primary during the discharge interval (which would decrease the peak voltage and peak power delivered to the load 130) the coupling factor is best taken to be substantially less than unity—preferably between 0.6 and 0.9 so that the secondary has a substantial leakage reactance. This leakage reactance also aids in limiting the peak negative grid voltage to a safe value. Also this leakage reactance delays the instant of maximum positive grid potential during the charging interval so that this grid voltage peak more nearly coincides with the instant of maximum plate current.

This effect also is advantageous and tends to increase the amount of energy which can be stored during the charging interval.

The foregoing preferred proportions for the transformer step-down ratio, the secondary leakage reactance, and the resistive shunt around the secondary winding are applicable for use with the circuit shown in Fig. 1 or circuits essentially similar thereto. More generally (and regardless of the type of circuit) the inductive device 121 should be a high power device designed for storing at least 300,000 ergs of energy when traversed by a current of a magnitude which can readily be handled by the space path of tube 122. In general also the inductive device 121 should, as previously mentioned, have a natural frequency higher than 30 kilocycles per second (and preferably higher than 100 kc./sec.). The natural frequency of the inductive device is herein understood to mean the lowest frequency at which such inductive device is naturally resonant when connected in its circuit, disregarding the effects of circuit resistance but taking into account the inherent distributed capacity not only of the device itself but also of the wiring and tubes associated therewith.

Thus, for example, the plate filament capacity of tube 122 may be considered as effectively connected across primary winding 121' (assuming that capacitators 124 and 125 are very large), while the grid plate capacity of this tube 122 may be considered as effectively connected between the upper ends of windings 121' and 121". Similarly, the grid filament capacity of 122 may be considered as connected across winding 121". Also the capacity of the complete oscillation generator 130 may be considered as connected across primary winding 121'. Thus the inductive device 121 should have a natural resonance above 30,000 cycles, and preferably above 60,000 cycles, per second when connected to all of the circuit elements as shown in Fig. 1 but with the resistor 123 removed and the resistive component of oscillation generator 130 eliminated. Even if transformer 121 be replaced by a single inductance coil or by a 3-winding transformer the above criteria with respect to energy storage capacity and natural frequency can be considered valid.

The oscillator 130 has heretofore not been considered in detail but has rather been considered merely as a load into which the surges from inductive device 121 were to be delivered. Preferably such oscillator consists of a push-pull tuned-plate, tuned-grid oscillator of the type wherein lecher wires are used for the tuned circuits. As shown in Fig. 1 two tubes 131, 132 are connected in push-pull with a lecher loop 133 tuning their plates and another lecher loop 134 tuning their grids. A leak-and-condenser circuit 135 provides biases for the grids in usual fashion.

Two conductors 138 and 139 serve to convey surge energy from inductive device 121 to the plate and cathode circuits of the oscillator. As shown, these conductors 138 and 139 are preferably short, rigid conductors very well insulated so as to be capable of withstanding the maximum surge voltages with a substantial factor of safety. The surge voltage applied over these conductors 138 and 139 may be considered as the B supply for the oscillator 130. Since this B supply is of very short duration and varies somewhat even during its effective duration, the wave train generated by oscillator 130 will correspondingly be of short duration and will probably also vary in amplitude more or less gradually. The build-up time is ordinarily substantially shorter than the dying-down time.

In some instances it may be desirable to terminate the wave train generated by oscillator 130 somewhat earlier than this oscillation would naturally end by virtue of the dying down of the pulse serving as B supply. In order to accomplish this the grid of modulator tube 122 may be connected through an inductance 136 to the grids of the oscillator 130, the value of the inductance 136 being so proportioned with respect to the capacity of the leak-and-condenser circuit 135 as to give a desired delay before the oscillations are extinguished. Preferably the inductance of coil 136 divided by the capacitance of leak-and-condenser circuit 135 is of the same order of magnitude as the square of the resistance of this leak-and-condenser circuit. The value of the coil 136 and the capacity of the circuit 135 may be adjusted to give a delay time slightly longer than the effective duration of the pulse transmitted from inductive device 121 to the oscillator 130. Thus, for example, if the effective duration of this pulse were 13 micro seconds, the delay might be adjusted to be a few micro seconds longer than 13 micro seconds, so that the oscillations generated by oscillator 130 would be cut off a few micro seconds after they had died below half their peak amplitude.

The waves from oscillator 130 are radiated by a dipole 142 which is coupled to the lecher wires 143 by a tuned output loop 141, and the radiation from this antenna 142 may be focused by a reflector 143. Preferably, the antenna 142 and the reflector 143 are rigid with respect to oscillation generator 130 and the modulator, including tube 122 and inductive device 121, is also mounted in fixed relationship to the oscillation generator 130 so as to permit the use of very short rigid connections 138 and 139 for transmitting the high tension required by the oscillation generator 130. The voltage supplied over the movable conductor arrangement 110 should be substantially lower than the voltage to be supplied to the oscillation generator and is preferably less than one-quarter of this voltage.

It will be understood that certain of the advantageous features of my invention can be realized by providing some other type of inductive modulator capable of magnifying the voltage supplied to it and of then applying such magnified voltage in the form of very brief pulses to the oscillation generator. An externally excited inductive modulator comprising an inductance and modulator tube somewhat as in so-called Heising plate modulation could be used, for example, if a suitable wave form were applied to the grid thereof so as to cause brief intense voltage surges to be generated by the inductance. Such an arrangement, however, would have the disadvantage that very substantial control voltages would be required to be fed to the grid of the modulator and these control voltages moreover would have a very irregular and sharp wave form which would contain many high harmonics. The transmission of such a high voltage abrupt wave form controlling signal to the modulator would be attended with substantial difficulties and thus some of the advantage resulting from decreasing the D. C. voltage to be transmitted between the units 100 and 120 would be lost.

Accordingly, it is preferred to employ in the general combination of my invention a magnetic modulator of the self-excited type wherein the high grid signal required for effecting the abrupt modulation is wholly or principally derived from the output of the modulator itself by means of a regenerative feedback connection—preferably an inductive feedback connection. It will be understood that a small amount of energy may be externally applied to the grid or cathode of tube 122 in order to synchronize the pulses produced by this tube with some external source. Nevertheless, I prefer that the major part of the control energy required in the input circuit of the modulator tube 122 be derived from the output circuit of this tube itself.

Although the magnetic modulator shown in the left-hand portion of unit 120 in Fig. 1 has been described only in connection with the combination of a D. C. power source 100, rotatable conductor arrangement 110, and a movable transmitter 120, it should be understood that such magnetic modulator having self-excitation is capable of many other applications and that the provision of such modulator is in itself one of the objects of my invention.

It is believed that Fig. 1 clearly illustrates the nature of my invention both with respect to the specific preferred type of magnetic modulator having self-excitation and also with respect to the general combination of a medium-tension power supply unit connected to a movable transmitter unit through a movable conductor arrangement with some sort of voltage magnifying modulator of the impulse modulating type disposed inside of the transmitter unit so as to step up the medium high voltage before feeding it to an oscillator. Nevertheless for the sake of completeness certain embodiments of the invention are shown in less schematic form in Figs. 2 and 3.

Referring more particularly to Fig. 2 the medium-high-tension D. C. power supply 200 is shown as being rigidly attached to a platform 211 which forms the support for a rotation joint of the slip ring type (generally designated as 210). The slip-ring joint comprises a flanged cylinder 212 bolted to the base 211 and provided with a porcelain core 213 through which extends a central conductor 214. A wiper 215 rigidly supported by insulator 215' from transmitter unit 220, wipes over the upper end of this conductor 214, while another wiper 216 wipes over a slip ring 217' which may be integral with the upper portion of flanged cylinder 212. A spider member 217 is journaled on the outside of this cylinder 212 and is provided with three arms to support the transmitter unit 220. Bus bars 218a, 218b connect the positive and negative medium tension D. C. outputs of unit 200 to cylinder 212 and central conductor 214, respectively, while bus bars 218c, 218d connect the wipers 216 and 215, respectively, to the positive and negative D. C. inputs of the transmitter unit 220.

A gear 219 is fixed to spider member 217 and is driven through suitable reduction gearing from a motor or manual control (not shown) to rotate spider 217 and transmitter unit 220.

In Fig. 3 another embodiment of my invention is illustrated. Unit 300 corresponds generally to unit 200, being a medium-high-tension D. C. power source. Power source 300 is illustrated as mounted in a trailer and as fed by an engine-driven 110-volt A. C. generator. The transmitter unit 320 corresponds generally to unit 220 of Fig. 2 but is mounted on a stand 321 which is arranged to permit two degrees of rotation, e. g. tilting and horizontal rotation, instead of merely one degree of rotation as shown in Fig. 2. The output of power source 300 is applied to transmitter unit 320 through a flexible cable 310 which may be an ordinary medium-high-tension flexible cable insulated with rubber or with a rubber-styrene compound and capable of withstanding a voltage of 6000 volts under adverse weather conditions and with a reasonable factor of safety.

This flexible cable 310 corresponds in a very general way to the rotation joint 210 of Fig. 2 since both of these serve the same purpose of permitting relative rotation between the units which they interconnect. The expression "rotatable conductor arrangement" will be understood as generically referring to any twistable or bendable arrangements (whether jointed or inherently flexible) which permit relative rotation between the units which they interconnect.

The transmitter units 220 or 320 may have rigidly attached thereto receiving antennae or even complete receiving equipments (not shown) in order to perform the functions of detecting or accurately locating remote aircraft, ships or the like.

Although I have described and shown certain embodiments of my invention for the purpose of illustration, it will be understood that variations, alterations and adaptations thereof occurring to one skilled in the art may be made without departing from the invention as defined in the appended claims.

What I claim is:

1. A wave train generating system comprising a first unit including a direct current source of predetermined voltage; a second unit including an oscillation generating circuit adapted to convert direct current energy of substantially higher voltage than said predetermined voltage into high frequency wave energy; rotatable conducting means extending between said units to provide galvanic connection therebetween while still permitting relative movement thereof; means in said second unit for converting direct current energy of said predetermined voltage into brief pulses of substantially higher voltage direct current energy; and highly insulated rigid connections for delivering said higher voltage direct current energy to said oscillation generating circuit for conversion into brief trains of high frequency waves.

2. A wave train generating system comprising a first unit including a direct current source of predetermined voltage; a second unit including means for converting direct current energy of said predetermined voltage into brief pulses of substantially higher voltage than said predetermined voltage, and oscillator means for converting said energy of said substantially higher voltage into high frequency wave energy; and conducting means connecting said direct current source to said converting means, the maximum voltage safely applicable to said conducting means being substantially lower than the maximum voltage safely applicable to said oscillator means.

3. A system for generating brief trains of high frequency waves, which comprises a stationary power supply unit including a direct current source of predetermined voltage; a rotatably mounted generator unit including circuit breaking means, an inductive device connected to said circuit breaking means, and an oscillation generating circuit adapted to convert direct current energy of substantially higher voltage than said predetermined voltage into high frequency wave energy; rotatable conducting means extending between said units to provide galvanic connection therebetween while still permitting relative movement thereof, the maximum voltage safely applicable to said conducting means being substantially lower than the maximum voltage safely applicable to said oscillation generating circuit; connections including said rotatable conducting means for passing current from said source through said inductive device and said circuit breaking means in series whereby said inductive device stores energy; means for periodically controlling said circuit breaking means to render the latter abruptly non-conductive, whereby said stored energy gives rise to brief surges of substantially higher voltage than the voltage of said power source; and highly insulated short rigid conductor means for transmitting said surges from said inductive device to said oscillation generating circuit whereby the energy thereof is converted into brief trains of high frequency waves.

4. A system for generating brief trains of high frequency waves, which comprises a stationary power supply unit including a direct current source of predetermined voltage; a rotatably mounted generator unit including an electron discharge device having a space path and control electrode means for varying the conductivity thereof, an inductive device connected to said space path, and an oscillation generating circuit adapted to convert direct current energy of substantially higher voltage than said predetermined voltage into high frequency wave energy; rotatable conducting means extending between said units to provide galvanic connection therebetween while still permitting relative movement thereof, the maximum voltage safely applicable to said conducting means being substantially lower than the maximum voltage safely applicable to said oscillation generating circuit; connections including said rotatable conducting means for passing current from said source through said inductive device and said space path in series whereby said inductive device stores energy; blocking means for periodically applying a negative potential to said control electrode means to render said space path abruptly non-conductive, whereby said stored energy gives rise to brief surges of substantially higher voltage than the voltage of said power source; and highly insulated short rigid conductor means for transmitting said surges from said inductive device to said oscillation generating circuit whereby the energy thereof is converted into brief trains of high frequency waves.

5. A system for generating brief trains of high frequency waves, which comprises a stationary power supply unit including a direct current source of predetermined voltage; a rotatably mounted generator unit including an electron discharge device having a space path and control electrode means for varying the conductivity thereof, an inductive device connected to said space path, and an oscillation generating circuit adapted to convert direct current energy of substantially higher voltage than said predetermined voltage into high frequency wave energy; rotatable conducting means extending between said units to provide galvanic connection therebetween while still permitting relative movement thereof, the maximum voltage safely applicable to said conducting means being substantially lower than the maximum voltage safely applicable to said oscillation generating circuit; connections including said rotatable conducting means for passing current from said source through said inductive device and said space path in series whereby said inductive device stores energy; feedback means for regeneratively feeding energy from said inductive device to said control electrode means whereby in response to a small decrease of effective conductivity of said space path said feedback means acts to effectively abruptly open said space path; timing means for periodically decreasing the effective conductivity of said space path to periodically initiate such effective opening thereof, whereby said stored energy gives rise to brief surges of substantially higher voltage than the voltage of said power source; and means for transmitting said surges from said inductive device to said oscillation generating circuit whereby the energy thereof is converted into brief trains of high frequency waves.

6. A system for generating brief trains of high frequency waves, which comprises a stationary power supply unit including a direct current source of predetermined voltage; a rotatably mounted generator unit including an electron discharge device having a space path and control electrode means for varying the conductivity thereof, an inductive device connected to said space path, and an oscillation generating circuit adapted to convert direct current energy of substantially higher voltage than said predetermined voltage into high frequency wave energy; rotatable conducting means extending between said units to provide galvanic connection therebetween while still permitting relative movement thereof, the maximum voltage safely applicable to said conducting means being substantially lower than the maximum voltage safely applicable to said oscillation generating circuit; connections including said rotatable conducting means for applying voltage from said source to said inductive device and said space path in series; feedback means for regeneratively feeding energy from said inductive device to said control electrode means, whereby in response to a small increase of effective conductivity of said space path said feedback means effects a rapid large increase in the conductivity thereof while in response to a small decrease of such effective conductivity said feedback means acts to effectively abruptly open said space path; timing means for periodically increasing the effective conductivity of said space path to initiate said large increase in conductivity whereby said inductive device stores energy; means for thereafter decreasing the effective conductivity of said space path to periodically initiate such effective opening thereof, whereby said stored energy gives rise to brief surges of substantially higher voltage than the voltage of said power source; and means for transmitting said surges from said inductive device to said oscillation generating circuit whereby the energy thereof is converted into brief trains of high frequency waves.

7. A wave train generating system according to claim 6 wherein said inductive device comprises a transformer primary while said feedback means comprise a secondary inductively coupled to said primary and connected to apply induced E. M. F. to said control electrode, and wherein said timing means comprise a resistive-capacitative circuit connected in series with said secondary.

8. A wave train generating system according to claim 6 wherein said inductive device comprises a transformer primary while said feedback means comprise a secondary inductively coupled to said primary with a coupling coefficient between .9 and .5 and connected to apply induced E. M. F. to said control electrode, and wherein said timing means comprise a resistive-capacitative circuit connected in series with said secondary, which further comprises a resistance shunted around said secondary.

9. A system for generating brief trains of high frequency waves, which comprises a stationary power supply unit including a direct current source of predetermined voltage; a rotatably mounted generator unit including an electron discharge device having a space path capable of carrying a predetermined current, and control electrode means for varying the conductivity thereof, an inductive device connected to said space path and having sufficient inductance to store at least 300,000 ergs of magnetic energy in response to the flow of said predetermined current while having a natural frequency of at least 30 kilocycles per second, and an oscillation generating circuit adapted to convert direct current energy of substantially higher voltage than said predetermined voltage into high frequency wave energy and having an effective resistance of the order of the critical damping resistance for said inductive device; rotatable conducting means extending between said units to provide galvanic connection therebetween while still permitting relative movement thereof, the maximum voltage safely applicable to said conducting means being substantially lower than the maximum voltage safely applicable to said oscillation generating circuit; connections including said rotatable conducting means for passing current from said source through said inductive device and said space path in series whereby said inductive device stores at least 300,000 ergs of energy; means for periodically applying a negative potential to said control electrode means to render said space path abruptly non-conductive, whereby said stored energy gives rise to surges of less than 20 microseconds effective duration and of substantially higher voltage than the voltage of said power source; and highly insulated short rigid conductor means for transmitting said surges from said inductive device to said oscillation generating circuit whereby the energy thereof is converted into trains of high frequency waves of less than 20 microseconds effective duration.

EMILE LABIN.

REFERENCES CITED

The following references are of record in the file of this patent:

UNITED STATES PATENTS

| Number | Name | Date |
|---|---|---|
| 2,037,799 | Koch | Apr. 21, 1936 |
| 2,103,362 | Hansell | Dec. 28, 1937 |
| 2,181,568 | Kotowski | Nov. 28, 1939 |
| 2,088,842 | Dallenbach | Aug. 3, 1937 |